United States Patent [19]

Robinson et al.

[11] 4,434,021
[45] Feb. 28, 1984

[54] REVERSE BUILDING PROCESS FOR THE MANUFACTURE OF COMPLEX-SHAPED VEHICLE FUEL TANKS

[75] Inventors: Keith D. Robinson, Cedartown; George P. Smitley, Rome, both of Ga.

[73] Assignee: Goodyear Aerospace Corporation, Akron, Ohio

[21] Appl. No.: 394,747

[22] Filed: Jul. 2, 1982

[51] Int. Cl.³ .............................................. B29C 5/02
[52] U.S. Cl. ................................ 156/242; 156/245; 156/304.2; 220/453; 280/5 R; 280/5 A
[58] Field of Search ............. 156/242, 245, 285, 304.2; 220/453; 280/5 R, 5 A

[56] References Cited

U.S. PATENT DOCUMENTS

| | | | |
|---|---|---|---|
| 3,509,016 | 4/1970 | Underwood et al. | 220/453 |
| 3,526,572 | 9/1970 | Finelli | 156/242 |
| 3,567,536 | 3/1971 | Wickersham | 156/242 |
| 3,755,040 | 8/1973 | Robinson | 156/242 |
| 3,801,402 | 4/1974 | Suter | 156/245 |

Primary Examiner—Caleb Weston
Attorney, Agent, or Firm—L. A. Germain; P. E. Milliken

[57] ABSTRACT

A manufacturing process for reverse building complex-shaped vehicle fuel tanks using complementary female mold halves which, when joined together about their mating peripheral edges, exactly duplicate the vehicle body cavity into which the completed tanks are to be mounted. Plies of a urethane elastomer are spray-coated into the molds and nylon fabric reinforcement is applied in two steps to complete the composite which forms the tank structure. Upon completion of forming of the composite, the mold halves are joined and a splice is completed from the inside of the tank by laying in reinforcement fabric at the butt joined sections of the composite and sealing it with urethane elastomer.

9 Claims, 6 Drawing Figures

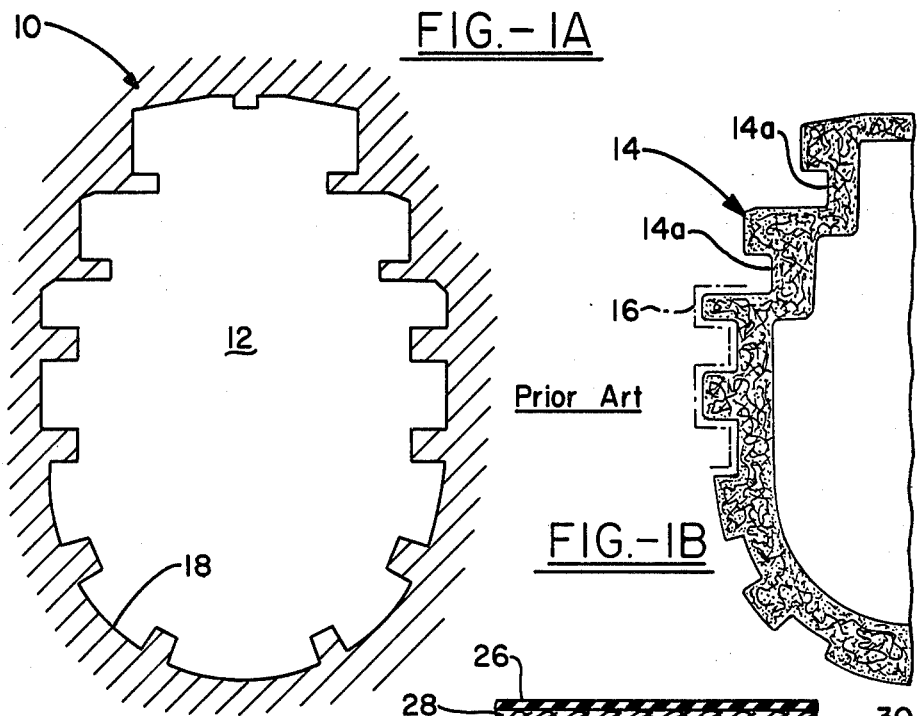
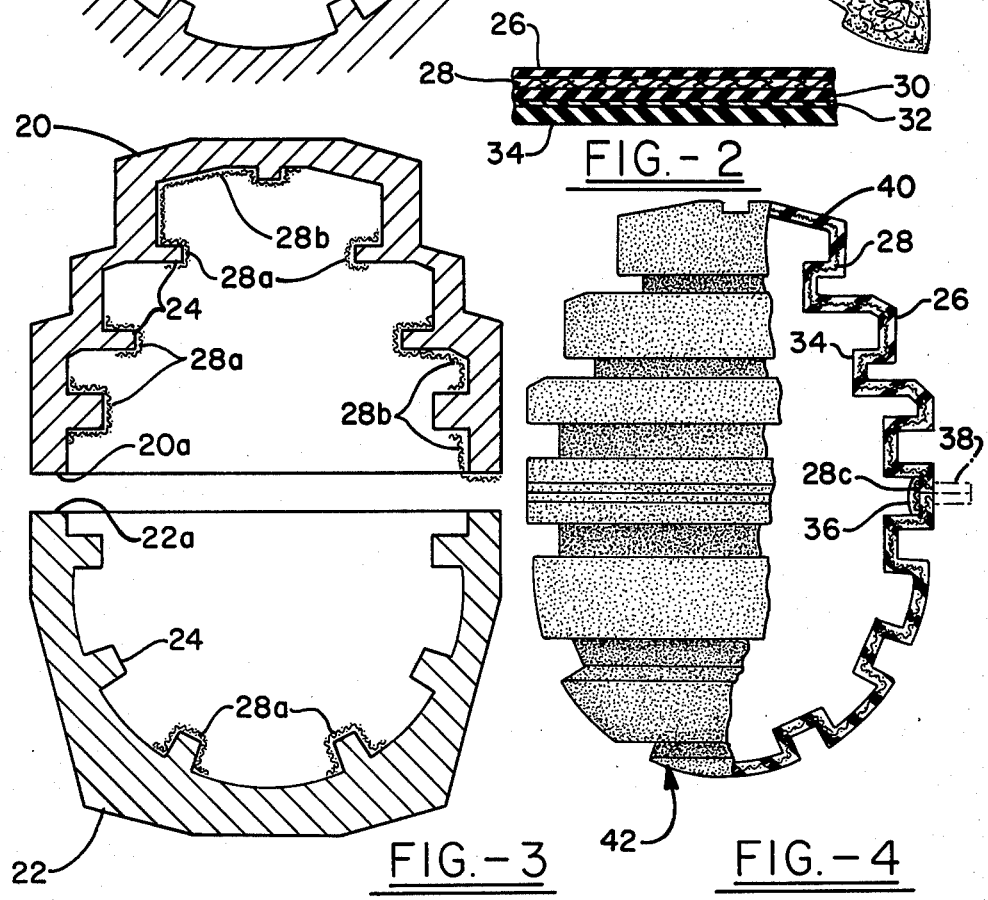

REVERSE BUILDING PROCESS FOR THE MANUFACTURE OF COMPLEX-SHAPED VEHICLE FUEL TANKS

BACKGROUND OF THE INVENTION

This invention generally relates to a manufacturing process for making lightweight, fabric-reinforced, elastomeric fuel tanks and more particularly to the manufacture of complex-shaped tanks of the type which are installed within the body framework or complex shaped cavity of an aircraft and/or road vehicle.

Fuel tanks of the type alluded to, and especially those which are made for aircraft installations, have been made for many years by a labor-intensive, inside-to-outside layup process. According to one of these prior art processes, a plaster/wood-wool mixture is formulated and applied to a mold fixture having the approximate configuration of the body framework cavity into which the fuel tank is to be installed. The fixture however is made undersized by an amount equal to the wall thickness of the finished tank. The plaster is cured for approximately 48 hours and removed from the fixture and the resultant male plaster form is used for layup of the fuel tank structure. Accordingly, and because it is a male form, the first ply of material applied to the plaster form will constitute the interior facing of the finished tank. Therefore, and to eliminate any possible discontinuities in the composite structure which may compromise the leak-proof integrity of the tank, the plaster form must be made as smooth as possible. Consequently, the plaster is hand-sanded to a smooth finish and then the various fittings which are required for the finished tank are mounted thereon. Finally, the materials forming the composite of the tank wall structure are applied to the plaster form and cured into an integral structure. Upon completion of the cure, the plaster form must be removed from the inside of the tank. This is accomplished by soaking the plaster in hot water, breaking it up into small pieces, and washing it out of the tank through one or more of the access fittings provided in the tank wall. Obviously, it is extremely important that all of the plastic is removed from the interior of the tank or contamination of the fuel will result.

Exemplary of the prior art pertaining to fuel tank manufacturing and the use of male forms are U.S. patents to E. M. Scharenberg (U.S. Pat. No. 2,394,492); M. R. Bell (U.S. Pat. No. 2,394,423); H. Noyes et al. (U.S. Pat. No. 2,890,489); and R. E. Bailey (U.S. Pat. No. 2,558,807).

While the described prior art process and the techniques of the above-referenced prior art patents have been used successfully for many years, the primary disadvantage centers upon the use of the male form. Because the male form is destroyed in the process of removing it from the interior of the tank, a new form is required for each and every tank made. Thus, the costs attendent to the making of these type complex-shaped fuel tanks have risen dramatically because of the labor intensive nature of a process requiring hand-made male forms.

Furthermore, and because the composite forming the tank wall structure is laid up on the male form, it must be applied to a plurality of recesses which form the complex shape of the plaster mold. Irrespective of whether the composite is laid up by spraying or by hand application techniques, these recesses are critical areas of the tank structure and careful attention must be paid when applying the composite materials to these areas.

In view of the beforementioned disadvantages of the prior art tank manufacturing processes using male forms, it is according to one aspect of the present invention, an object to manufacture high technology, complex-shaped fuel tanks without resort to the use of male forms.

It is in accordance with another aspect of the invention, an object to provide a manufacturing process which results in a more accurate location of tank fittings and thus eliminates installation problems when the tank is mounted in a complex shaped vehicle cavity.

It is in accordance with still another aspect of the invention, an object to provide a fuel tank having more accurate exterior dimensions and the differences between subsequently manufactured tanks are kept to a minimum.

SUMMARY OF THE INVENTION

The beforementioned and other aspects and advantages of the invention are accomplished in a process for the manufacture of complex-shaped, fabric-reinforced, elastomeric fuel tanks comprising the steps of: providing complementary female mold sections which when combined about their peripheral edges exactly duplicate the geometry of the body framework cavity of the vehicle, said female mold sections having bosses formed in the mold for locating and mounting various tanks fittings thereon; applying a ply of a release material to the interior surface of each mold section; spray-coating a urethane elastomer onto the release ply in each mold section; applying nylon fabric patches to the molds in the areas of complex contours; applying a nylon fabric sheet material to the interior of each mold and cutting said sheet in the area of complex contour such that the sheet presents a smooth surface about the complex contours; spray-coating a urethane elastomeric cover ply over the fabric ply; installing fittings over the bosses provided in the mold sections and securing said fittings in place via adhesive and a suitable pressure pack; spray-coating a barrier film ply onto the cover coat; spray-coating a urethane elastomeric ply onto the barrier film ply to act as an inner liner for the tank; buffing the composite layup about the peripheral edges of the molds and applying adhesive material to said peripheral edges; joining the two mold sections together at their mating peripheral edges and clamping said edges; applying a width of reinforcement fabric to the inside of the joined sections at the interface of the composite formed therein so as to lap and splice the edges of the joint; applying urethane elastomer to the fabric to cover it and complete the splice; and allowing the completed tank structure formed by the composite to cure into an integral structure.

DESCRIPTION OF THE DRAWINGS

The features of the invention will become more fully appreciated and made apparent from the detailed description that follows when considered in conjunction with the accompanying drawings in which:

FIGS. 1A and 1B illustrate the prior art method of making a complex-shaped fuel tank using a plaster male form, the views being elevational cross-sections illustrating the relationship between the male form and the cavity of a vehicle body framework within which the completed fuel tank will be mounted, the specific sectional configuration shown in the drawing now necessarily being that of an actual fuel tank but is shown purely for illustrative purposes only;

FIG. 2 is an elevational view, in cross-section, showing the piles of materials which form the composite of the tank structure;

FIG. 3 is an elevational view, in cross-section, showing a representative female mold for making a fabric-reinforced, elastomeric fuel tank which will exactly fit the vehicle body cavity illustrated in FIG. 1A;

FIG. 4 is an elevational view, in partial section, of a fuel tank made according to this invention.

DETAILED DESCRIPTION OF THE INVENTION

Figure 5:
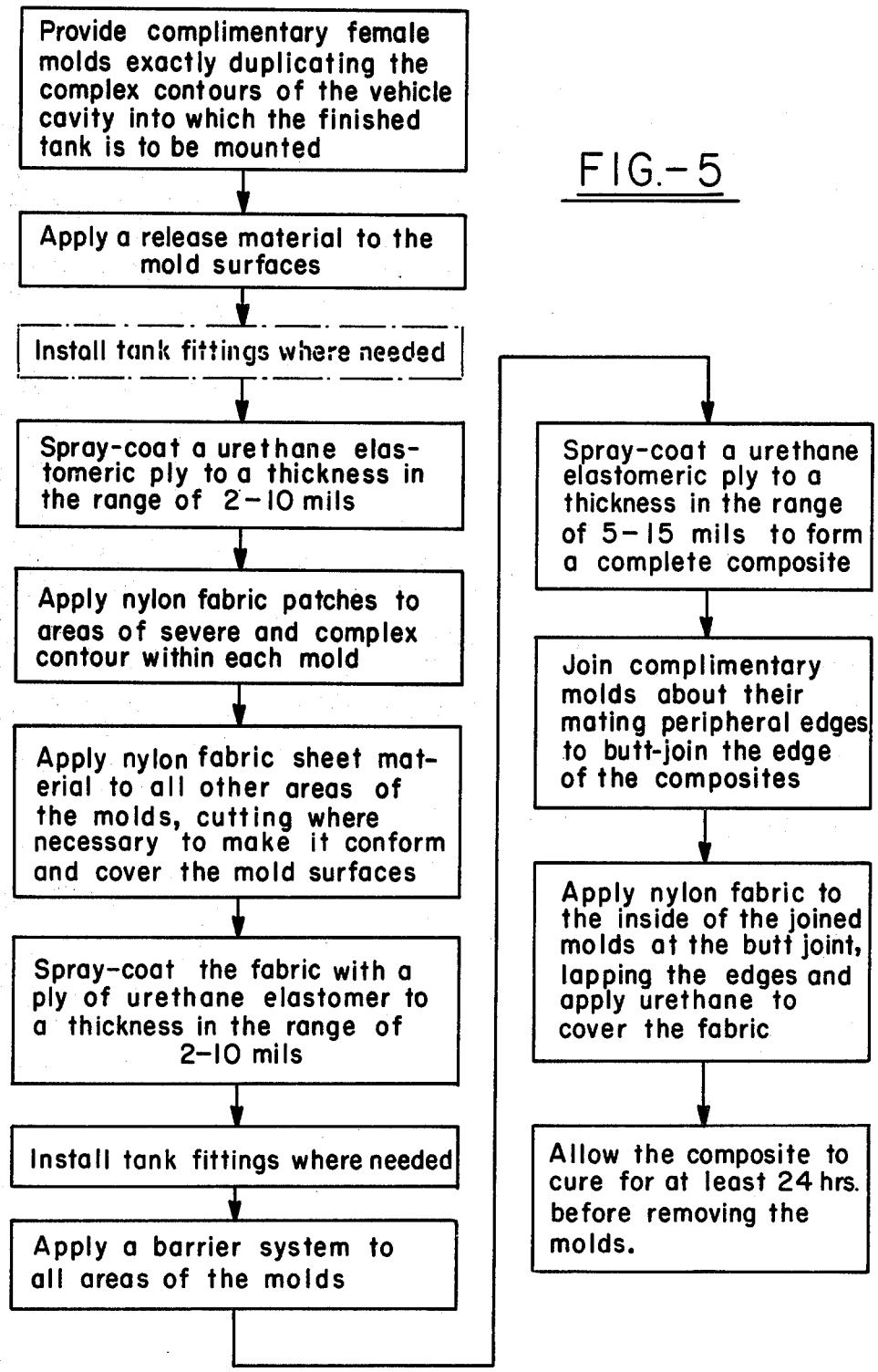
FIG. 5 is a flow diagram illustrating the process steps according to this invention.

Referring to FIGS. 1A and 1B, the components used for the prior art process in the manufacture of complex-shaped fuel tanks are illustrated. The body framework of the vehicle is generally indicated by reference numeral 10 and would normally include various structural members (not specifically shown) which define a cavity 12 into which a fabric reinforced elastomeric fuel tank will be mounted. As hereinbefore stated, a plaster form 14 shown in FIG. 1B is made that follows the contours of the cavity 12 and this form is dimensionally smaller than the cavity 12. The reason for this is the fact that the tank will be built up on the outside of the male form 14 and therefor sufficient space must be considered for the tank wall thickness so as to fit within the cavity 12. The amount by which form 14 is smaller depends of course upon the wall thickness of the tank and this may be as indicated in the drawing by the ghost lines 16. Because of the differences in dimension between the actual cavity and the male form, tanks made by the prior art processes using such male forms have not met the space requirements demanded by modern aircraft. Furthermore, and because these tanks are built up on male forms, the materials forming the composite, whether applied by spraying or by hand applications, are applied to recesses 14a formed by the complex shape of the mold. The recesses 14a are critical areas of the tank structure and careful attention must be given to these areas when building the tank.

Now therefor, and to eliminate the inaccuracies of the prior art processes due to the use of the male form 14, the present process will be described with reference to FIGS. 2, 3, 4, and 5.

First, a dimensionally accurate female mold is made of the vehicle framework cavity 12 and this mold is made in two parts, an upper mold section 20 and a lower mold section 22. The female mold is made according to conventional mold making techniques and is made such that every contour of the cavity 12 will be represented in the contours of the fuel tank structure when it is completed in the mold. Because this invention is primarily directed to fuel tanks which occupy very limited space in the body framework of, for example, a fighter aircraft and every available volume of space will be utilized for fuel storage, it should be appreciated that the dimensional accuracy of the mold sections 20, 22 with respect to the cavity 12 is important to the success of these type fuel tank structures.

The female mold sections 20, 22 are complementary to each other and when positioned in a mating relationship about their respective peripheral edges 20a, 22a they present an accurate duplication of the cavity walls 18. According to the present process, the mold sections 20, 22 are first coated with a release ply so as to facilitate removal of the finished tank from the mold. Next a spray coat 26 of a urethane elastomer such as Vithane ™ is applied to the mold sections and this will ultimately be the outer surface of the finished tank. The Vithane elastomer is chosen so as to contain an amount of solids in solution within the range of 20-70% and preferably about 35-45%. For example, the set time at about 40% is approximately one hour and therefore sufficient time is available between various of the ply applications and for quality control purposes but is short enough to facilitate a production line type manufacturing process. The Vithane elastomer is applied at a rate within the range of 0.01-0.50 gal/min dependent upon operator control and to a thickness of about 3-6 mils and preferably to a nominal thickness of about 4 mils.

™ The Goodyear Tire & Rubber Company

The next step in the process involves the placement of a fabric reinforcement 28 and it is applied in two steps. First, a plurality of fabric patches 28a are applied to the areas in the molds that have severe and complex contours as shown in FIG. 3. In this respect, it will be appreciated that the complex contours are not recesses 14a such as experienced in the use of a male form shown in FIG. 1B, but rather are protrusions 24 which are more easily covered by the materials forming the composite. The patches 28a are of a shape and size to conform easily over any complex contour of the mold and are held in place by the urethane elastomeric ply 26 which was previously applied and has set sufficiently to accomplish this task. A preferred fabric for this application may be a plain woven nylon having a weight of about 1.5-6.0 oz/sq yd and depending upon the weight may vary in thickness within the range of 5-15 mils. Secondly, a sheet of the same grade fabric material 28b is placed within each mold section and smoothed in place so as to follow the contours of the mold. The sheet fabric is cut or slit in the areas of severe contour that have been previously covered by the fabric patches 28a. The purpose of the patches 28a should now be appreciated in that they complete the fabric ply 28 in areas of the mold not capable of being covered by sheet material. Thus every contour of the mold cavity is covered by fabric reinforcement material 28 whether it be by the patches 28a or by the sheet material 28b.

Next, the fabric material 28 is spray-coated with a cover ply of urethane elastomer 30 which may also be Vithane at a rate within the range of 0.1-0.5 gals/min and to a thickness within the range of 3-6 mils and preferably to about 4 mils. The plies 26,30 of Vithane elastomer thus encapsulate the fabric reinforcement 28.

Tank fittings are next mounted on the bosses provided in the mold sections and these are adhesively secured to the underlying plies and secured in place by a pressure pack. A pack suitable for this purpose may comprise a thickness of foam material positioned adjacent the fitting and held in place by a bolted-down pressure plate. The inventors have also found that the tank fittings may be installed first, i.e., immediately after applying the release ply to the molds as indicated by the ghost line showing in FIG. 5. In this circumstance, the fitting are mounted on the outside of the tank and this was found not to compromise their leakproof integrity. Furthermore, and because they are installed directly adjacent the mold surface, the appearance of the fitting installations is improved in the finished product.

To continue, the urethane ply 30 is followed by a spray application of a barrier system which may be a highly cross-linked urethane specifically compounded for this duty or a nylon film 32 of approximately 2 mil thickness. The barrier system serves to protect the fabric from hydrocarbon fuel which may penetrate the composite. Finally, a ply of Vithane elastomer 34 is spray-coated at a rate of about 0.1–0.5 gals/min and to a thickness within the range of 10–15 mils. This ply serves as the inner facing or liner ply of the composite 40 forming the finished fuel tank 42 as shown in FIG. 4.

Prior to joining the two mold sections 20,22 to form the complete tank structure, the composite material 40 is buffed at the edges of each mold in the areas 20a,22a. The material in this area forms a butt splice of the two tank sections as illustrated at 38 in FIG. 4. An adhesive elastomer is applied to the buffed area and the two complementary mold sections 20,22 are joined at their peripheral edges and clamped.

To complete splicing together of the two butt-joined sections of the tank, access is gained into the interior of the tank through the fittings or through an access port provided for this purpose. A splice is made by laying in a width of reinforcement fabric 28c sufficient to lap the butt-joined upper and lower tank sections and then brushing additional urethane elastomer 36 thereover to seal the fabric.

The composite 40 forming the tank structure is allowed to cure for at least 24 hours and the completed tank 42 is removed from the mold sections 20,22 as a single integral unit. Finally, any excess material forming the splice such as illustrated in ghost lines at 38 may be cut off or trimmed so as not to interfere when the tank is mounted in the vehicle cavity 12.

Following the process steps as described above, fuel tank structures may be made having all gauge thicknesses within the range of 20–45 mils, weights within the range of 0.145–0.175 lbs/sq ft and tensile and elongation within the ranges of 1000–7000 psi and 250–500% respectively. For example, a particular tank made according to the described process had a composite construction comprising 4 mils urethane outerply, 10 mils fabric, 4 mils urethane intermediate ply, 2 mils barrier, and 12 mils urethane liner ply. A nominal total thickness of 32 mils was achieved at a nominal weight of 0.163 lbs/aq ft and exhibited elongation of about 350% and tensile of about 4000 psi.

While the composite forming the completed tank may be curved at ambient temperature to the extent that the structure may be removed from the molds after about 24 hours, it is preferable that the cure be extended to about 48 hours. It will, of course, be recognized by those skilled in the art that the cure time may be accelerated by increasing the curing temperature and in this respect it was found that the Vithane elastomer may be cured at a temperature within the range of 120–160 degrees F.

From the foregoing description, it must now be appreciated that the invention provides a much simpler manufacturing process than heretofore practiced by the elimination of the male form. Furthermore and because the tank is made in a female mold and the outside ply is against the mold cavity, the finished tank has a better appearance than previously made tanks and the structure fits more closely the complex contours of the cavity into which it is to be used.

What is claimed is:

1. A process for the manufacture of a complex-shaped, fabric-reinforced elastomeric fuel tank of the type for installation into a vehicle body cavity comprising the steps of:

providing complementary female mold sections which, when joined together, substantially duplicate the complex geometry of the cavity, said mold sections having means for locating and mounting tank fittings thereon;

applying a ply of a release material to the surfaces of each mold section;

spray-coating a first ply of a urethane elastomer having 20–70% solids in solution at a rate of 0.1–0.5 gals/min into each mold section;

applying a square-woven 1.5–6.0 oz/sq yd nylon fabric to all areas by first applying fabric patches to the areas of severe complex contour and then applying fabric sheet material to all other areas, cutting the sheet to follow and conform to the contours of the mold;

spray-coating a second ply of urethane elastomer to cover the nylon fabric material;

installing tank fittings on the means provided and securing said fittings in place by suitable pressure applicators;

spray-coating a fuel resistant film over the elastomer to provide barrier to hydrocarbon fuels;

spray-coating a third ply of urethane elastomer onto the barrier film to provide a liner for the tank;

applying an adhesive elastomer to the peripheral edges of the complementary molds;

joining the two mold sections together about their mating peripheral edges and clamping said edges;

applying nylon fabric material and urethane elastomer on the inside of the joined sections at the interface of the peripheral edges to form a splice between the two sections; and allowing the composite forming the tank to cure into an integral structure.

2. The process as set forth in claim 1 wherein the urethane elastomer comprises 40% solids, exhibits a set time of about 1.0 hour and is allowed to cure for at least 24 hours at ambient temperature.

3. The process as set forth in claim 1 wherein the urethane elastomer comprises 40% solids, exhibits a set time of 1.0 hours and is cured at a raised temperature of about 120°–160° F.

4. The process as set forth in claim 1 wherein the first and second urethane elastomer plies adjacent the fabric have a thickness within the range of 3–6 mils and the elastomeric liner has a thickness within the range of 5–15 mils.

5. The process as set forth in claim 4 wherein the first and second urethane elastomeric plies are spray-coated to a thickness of about 4 mils and the liner ply of urethane elastomer is spray-coated to a thickness of about 12 mils.

6. The process as set forth in claim 5 wherein the urethane elastomer comprises about 40% solids in solution, has a set time of about one hour, and exhibits an elongation of about 350 percent and tensile of about 4000 psi when cured.

7. The process as set forth in claim 6 wherein the tank is cured at a raised temperature of about 120°–160° F.

8. The process as set forth in claim 1 wherein the tank fittings are secured in place by pressure applicators comprising a plastic from pad positioned adjacent the fitting and a rigid plate bolted to the mold to apply a compressive force to the foam and thus to the fitting until it is cured in place.

9. The process as set forth in claim 1 wherein the fittings are installed in-the mold sections prior to spray-coating off the first ply of the urethane elastomer but after the application of release material.

* * * * *

UNITED STATES PATENT AND TRADEMARK OFFICE
CERTIFICATE OF CORRECTION

PATENT NO. : 4,434,021
DATED : 02-28-84
INVENTOR(S) : Keith D. Robinson and George P. Smitley It is certified that error appears in the above–identified patent and that said Letters Patent are hereby corrected as shown below:

Column 3, line 5, "piles" should read --- plies ---.

Column 4, line 15, "0.01-0.50" should read --- 0.10-0.50---.

Column 5, line 47, "curved" should read ---cured---.

Column 6, line 61, "from" should read --- foam --- and at line 66, "off" should read --- of ---.

Signed and Sealed this

Nineteenth Day of June 1984

[SEAL]

Attest:

Attesting Officer

GERALD J. MOSSINGHOFF
Commissioner of Patents and Trademarks